United States Patent

Pinkney

Patent Number: 5,609,324
Date of Patent: Mar. 11, 1997

[54] ONE PIECE COUPLER FOR A CURB BOX VALVE

[75] Inventor: William J. Pinkney, Ontario, Canada

[73] Assignee: Hayward Iron & Metal, Canada

[21] Appl. No.: 436,737

[22] Filed: May 8, 1995

Related U.S. Application Data

[63] Continuation-in-part of Ser. No. 317,572, Oct. 4, 1994, abandoned.

[51] Int. Cl.$^6$ .................................................. F16K 31/46
[52] U.S. Cl. ............................................ 251/292; 251/293
[58] Field of Search ...................................... 251/292, 293

[56] References Cited

U.S. PATENT DOCUMENTS

| | | |
|---|---|---|
| 53,736 | 4/1866 | Frailey . |
| 95,724 | 10/1869 | Rausch ..................................... 251/292 |
| 107,434 | 9/1870 | Bailey . |
| 551,729 | 12/1895 | Holt ..................................... 251/292 X |
| 625,590 | 5/1899 | Murray . |
| 729,672 | 6/1903 | Sack . |
| 935,856 | 10/1909 | O'Meara . |
| 972,384 | 10/1910 | Kellar et al. . |
| 1,170,138 | 2/1916 | Bohne et al. . |
| 1,577,490 | 3/1926 | Poe ..................................... 251/293 X |
| 1,827,861 | 10/1931 | Volkhardt ..................................... 251/293 |
| 2,186,925 | 1/1940 | Hooper et al. . |
| 2,865,530 | 12/1958 | Gould . |
| 3,195,198 | 7/1965 | Hoopes III . |
| 4,030,696 | 6/1977 | Bake et al. . |
| 4,127,141 | 11/1978 | Ledonne et al. . |
| 4,310,145 | 1/1982 | Wempe . |
| 4,420,012 | 12/1983 | Astrom . |
| 4,702,275 | 10/1987 | Ballun et al. . |
| 4,899,780 | 2/1990 | Astrom . |

Primary Examiner—Stephen M. Hepperle

[57] ABSTRACT

A one piece coupler for a curb box shut off valve comprised of a shaft having a top and a base, the base being comprised of a U-shaped member having two depending arms extending longitudinally parallel to the longitudinal centerline of the shaft, each depending arm of the U-shaped member having spring loaded fastening means therein, at least one of which spring loaded fastening means is adjustable, the spring loaded fastening means extending substantially perpendicularly to the longitudinal axis of the shaft, the top of the shaft being shaped to receive turning means.

1 Claim, 2 Drawing Sheets

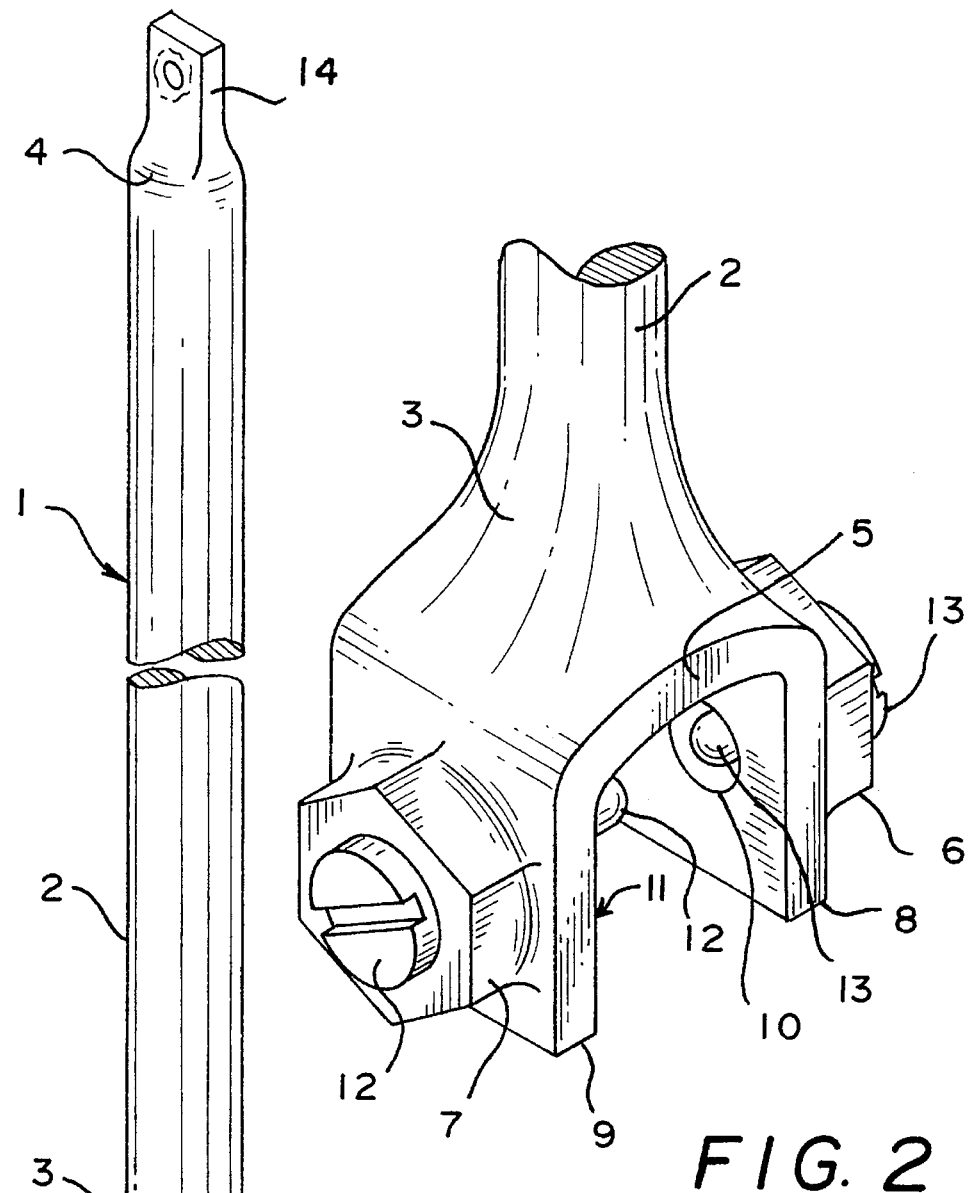
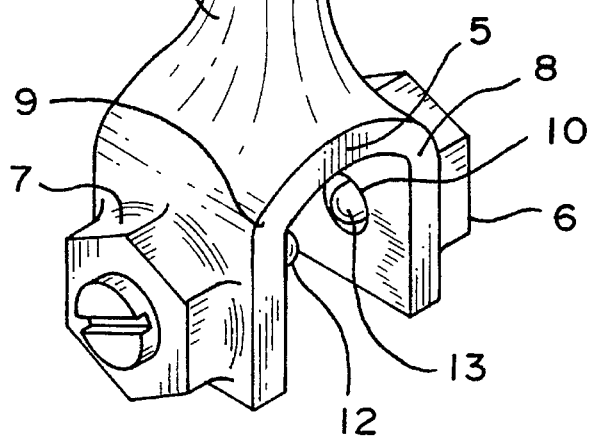
FIG. 2
FIG. 1

ONE PIECE COUPLER FOR A CURB BOX VALVE

CROSS-REFERENCE TO RELATED APPLICATIONS

The present application is a continuation-in-part application of application Ser. No. 08/317,572, filed Oct. 4,1994, now abandoned.

BACKGROUND OF THE INVENTION

This invention relates to a one piece coupler for a curb box shut off valve. Curb box valves are installed between the main water line on a street and the water line connecting the main water line to a residence or a business. Couplers extend from the valve stem of the curb box valve which may be four or more feet underground to just below the surface of the ground. The coupler is a generally vertical rod connected at its lower end to the valve stem and having a shaped upper end adapted to fit into a T or other turning device which municipal employees may use to open or close the curb box valve controlling the supply of water to the residence or business.

Existing couplers for curb valves are comprised of a number of components. The lowermost component on existing couplers is a brass bell shaped device, the bell facing downwardly. Extending through the sides of the brass bell on a common centerline perpendicular to the centerline of the brass bell are a spring loaded ball plunger and an opposed adjustable ball stop. The top of the curb box shut off valve stem which is generally rectangular in cross section contains détentes on both the longer sides of the valve stem. The spring loaded ball in the wall of the brass bell is forced into the shaft of the spring loaded ball plunger when the bell is pressed over the top of the valve stem. The spring loaded ball springs out when it reaches the détente in the side of the valve stem. The brass bell is retained on the valve stem by the spring loaded ball and the opposed ball button stop in the détentes on either side of the valve stem.

The top of the brass bell features a stem having an aperture therein. A second component of the prior art coupler is a rod, normally of approximately four feet which extends from the top of the bell to just below the surface of the ground. The bottom of the rod has attached thereto a downwardly disposed U-shaped extension. Both arms of the U have apertures which are aligned with the aperture in the stem at the top of the brass valve. A cotter pin is normally inserted through one of the apertures in one of the U-shaped arms, through the aperture in the stem of the bell disposed between the U-shaped arms and through the aperture in the other arm of the U-shaped extension on the bottom of the rod. The brass bell and the rod are retained together by a cotter pin which is the third component of existing couplers.

The top of the rod includes fastening means whereby a T may be connected to the top of the coupler by municipal water employees to turn the rod, cotter pin, brass bell and valve stem to either open or close the curb box shut off valve.

One year after installation of the curb box shut off valves many municipalities check the curb box shut off valves installed the previous year. After only one year in the ground occasions have occurred where the cotter pin has broken when the curb side valve was tested.

SUMMARY OF THE INVENTION

In the instant invention the coupler for a curb box shut off valve is comprised of a single piece preferably assembled from stainless steel components. The bottom of the stainless steel rod has permanently fastened thereto a U-shaped extension extending downwardly to form the base of the rod. Permanently fastened through opposed arms of the U-shaped extension on a common centerline perpendicular to the longitudinal centerline of the rod are a spring loaded ball in one arm and an adjustable ball stop in the other arm.

The spring loaded ball and the opposed adjustable ball stop are adapted to slide over the top of the stem of the curb box valve and expand into the détentes in the opposite sides of the valve stem to retain the rod on the valve stem. The top of the rod as in the prior art is shaped to receive a T or other turning means used by employees of the water works department to turn on or turn off curb box valves.

The coupler of the instant invention is one piece and as such is cheaper to manufacture and less likely to be damaged than three piece prior art couplers currently in use. The design of the coupler of this invention does not require a relatively expensive brass bell or alternatively cotter pin which are sometimes found to be the weak link in existing curb box valve couplers. The cost of replacing a coupler which is broken and wig not turn a valve is substantial no matter how the substitution of a new coupler is affected.

In one embodiment the invention relates to a one piece coupler for a curb box shut off valve comprised of a shaft having a top and a base, the base being comprised of a U-shaped member having two arms extending longitudinally parallel to the longitudinal centerline of the shaft, each depending arm of the U-shaped member having spring loaded fastening means therein; the top of the shaft being shaped to receive turning means. Preferably all the components of the one piece coupler are stainless steel.

The preceding description relates to a one piece coupler for a curb box valve having a U-shaped member at the bottom of the coupler shaft. The U-shaped member is fastened to the top portion of the stem of the shut off valve.

The shut off valve is located in the waterline between the main line and the premises. Inwardly biased retaining means disposed on the inner surfaces of the U-shaped members are used to fasten the coupler to the top portion of the shut off valve stem.

The stem extending upwardly from the shut off valve has indents to receive the spring loaded fastening means. The stems of many shut of valves also include an aperture extending through the stem of the shut off valve from one side to the other side thereof. Certain users of couplers for curb box valves prefer to use means other than bias means for fastening the coupler to these stem of the curb box valve stem. I have found that by removing the biasing mechanism in opposed arms of the U-shaped members above and substituting a small aperture in the opposed arms of the U-shaped member, which aperture may be aligned with the aperture extending through the stem of the shut off valve, that the coupler may be fastened to the stem of the shut off valve using a stainless steel ball which is inserted through the aperture in one wall of the U-shaped member, through the aperture in the stem of the shut off valve and then through the aperture in the opposite wall of the shut off valve.

DESCRIPTION OF THE DRAWINGS

FIG. 1 is a perspective view of the one piece coupler for a curb box valve.

FIG. 2 is a more detailed perspective view of the base of the one piece coupler for a curb box valve.

DESCRIPTION OF THE PREFERRED EMBODIMENTS

Figure 3:
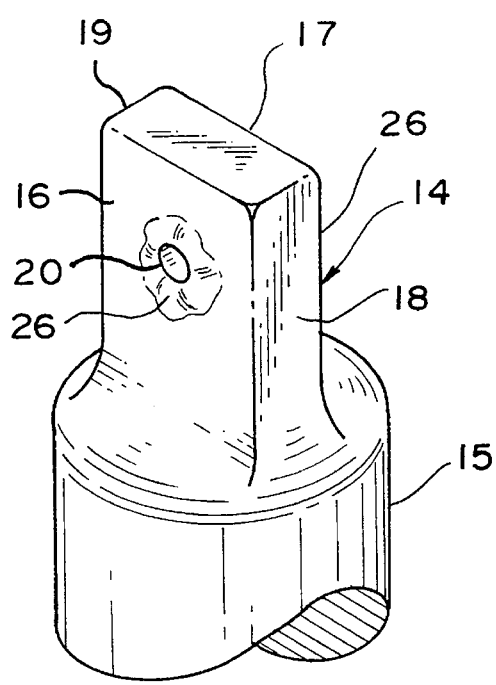
FIG. 3 is a perspective view of the stem of the shut off valve showing indentations on both sides of the aperture.

As seen in FIG. 1 the one piece coupler 1 for a curb box valve is comprised of a shaft 2 having an integral base 2 and an integral top 4. As seen best in FIG. 2 the base 3 is comprised of a U-shaped component 5 which is welded to the bottom of shaft 2 and forms an extension of the shaft 2. Nuts 6, 7 are welded to the exterior of the walls 8 and 9 of U-shaped component 5. Each of walls 8 and 9 have apertures 10 and 11 in their respective walls. The diameter of the apertures 10 and 11 corresponds to the diameter of the threaded apertures of the nuts 6, 7. A stainless steel spring loaded check ball 12 is threaded in the aperture 10 in the wall 9 and the nut 7. A stainless steel adjustable ball stop 13 is threaded in the aperture 11 in wall 8 and the aperture in the nut 6. The stainless steel spring loaded check ball 12 and the stainless steel adjustable ball stop 13 are threaded a sufficient distance into their respective walls and nuts so that the top of the valve stem of the curb box shut off valve will be received in the U-shaped component 5 and be retained in the U-shaped component 5 by expansion of the stainless steel adjustable ball stop into one détente of the valve stem and pressure exerted by the stainless steel adjustable ball stop 13 in the opposite détente in the side of the valve stem (not shown). The top of the one piece coupler 1 for a curb box valve as shown at 4 is comprised of a stem 14 which is adapted to be received in a T to turn the curb box valve coupler and connected valve stem.

The one piece coupler 1 for a curb side valve is installed on the valve stem by placing the base 3 and more particularly the U-shaped component 5 of the base 3 over the top of the valve stem of the curb side valve. The one piece coupler 1 is then struck downwardly causing the top of the valve stem to compress the stainless steel spring loaded check ball 12 into the aperture 11 in the wall 9 and nut 7. The top of the valve stem proceeds upwardly into the U-shaped component 5 until the stainless steel spring loaded check ball 12 and stainless steel adjustable ball stop 13 are retained in détentes on either side of the valve stem.

Figure 4:
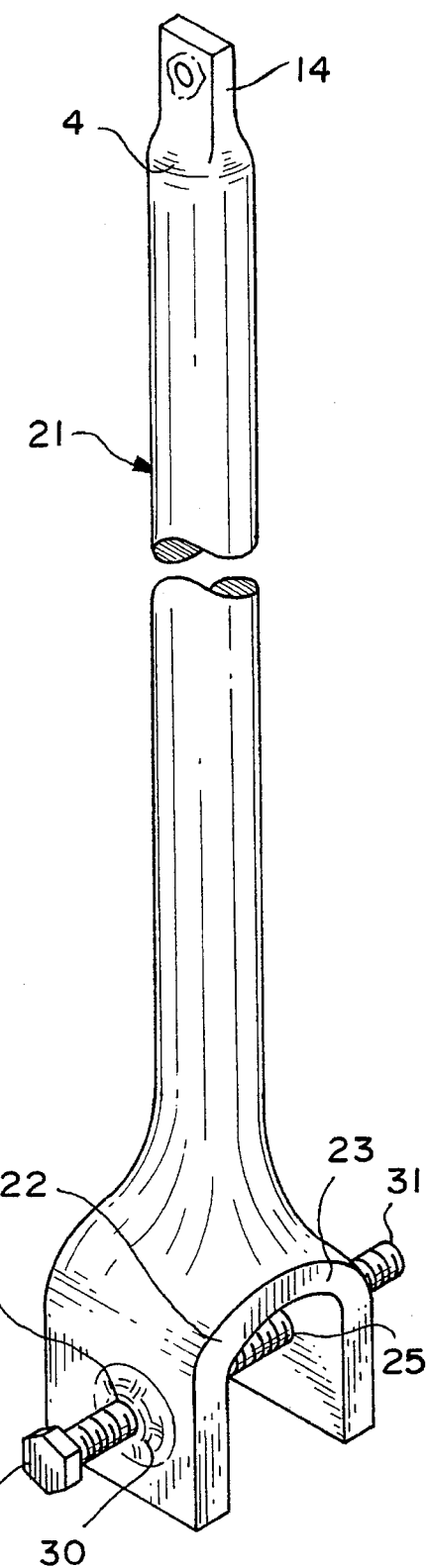
FIG. 4 is a perspective view of the base of the one piece coupler with apertures in the arms of the U-shaped member.

FIG. 3 shows the top portion 14 of the valve stem 15 of the shut off valve which is located in the water line extending from a main line to premises. The top 14 of the valve stem 15 has indentations 26 on both sides 16, 17 and squashed ends 18, 19. An aperture 20 extends through the top portion 14 of the valve stems from one side 16 to the other side 17. Referring to FIG. 4 there is shown a coupler 21 which is the same as the one piece coupler 1 of FIG. 1 with the exception of the stainless steel spring loaded check ball 12, the stainless steel adjustable ball stop 13 and the size of the apertures in the walls 8 and 9. As shown in FIG. 1 the diameter of the apertures 10 and 11 in walls 8 and 9 corresponds to the diameter of the threaded apertures of the nuts 6, 7. The walls 22 and 23 of coupler 21 of FIG. 4 each have an aperture 24 and 25 extending through the respective walls 22 and 23. The diameter of the apertures is sufficient to receive a stainless steel bolt 31. The apertures 24 and 25 are located on a common centerline which is perpendicular to the outside surface of walls 22 and 23. A stainless steel nut 30 is welded over aperture 24 to receive the thread of stainless steel bolt 31.

Figure 5:
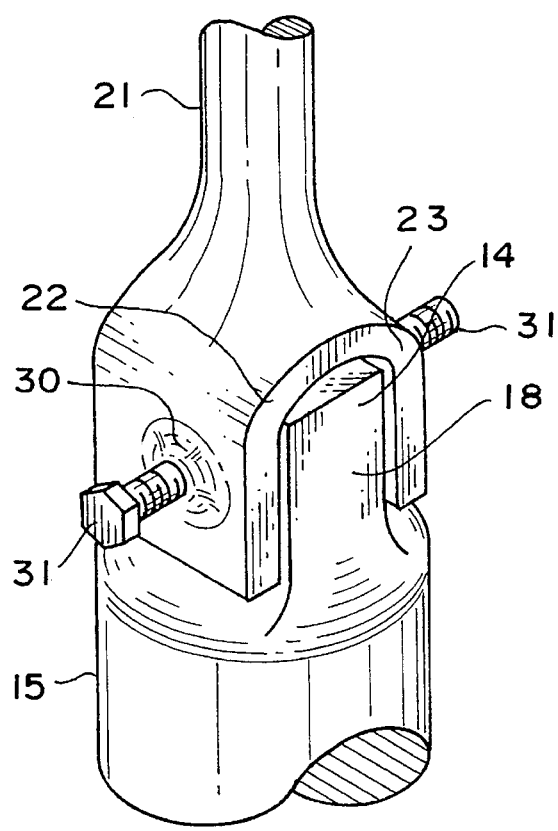
FIG. 5 is a perspective view of the one piece coupler attached to the stem of the shut off valve by a stainless steel ball.

Referring to FIG. 5, the base of coupler 21 is shown assembled with the upper portion 14 of the valve stem 15. A stainless steel bolt 31 is shown inserted through the stainless steel nut 30 and the aperture 24 in wall 22, through the aperture 20 in upper portion 14 of valve stem 15 and through the aperture 25 of wall 23 to fasten the coupler 21 to the upper portion 14 of the valve stem 15.

While details of the invention and its operation have been described it will be recognized by those designing and manufacturing curb box valve couplers that variations may be made in details of the invention as described without departing from the essence of the invention.

We claim:

1. A one piece coupler for a curb box shut off valve comprised of a shaft having a top and a base, the base being comprised of a U-shaped member having two depending arms extending longitudinally parallel to the longitudinal centerline of the shaft, each depending arm of the U-shaped member having spring loaded fastening means therein, at least one of said spring loaded fastening means being adjustable, the spring loaded fastening means extending substantially perpendicularly to the longitudinal axis of the shaft, the top of the shaft being shaped to receive turning means.

* * * * *